J. F. EVANS.
WHEEL.
APPLICATION FILED OCT. 2, 1914.
1,154,497.
Patented Sept. 21, 1915.
2 SHEETS—SHEET 1.
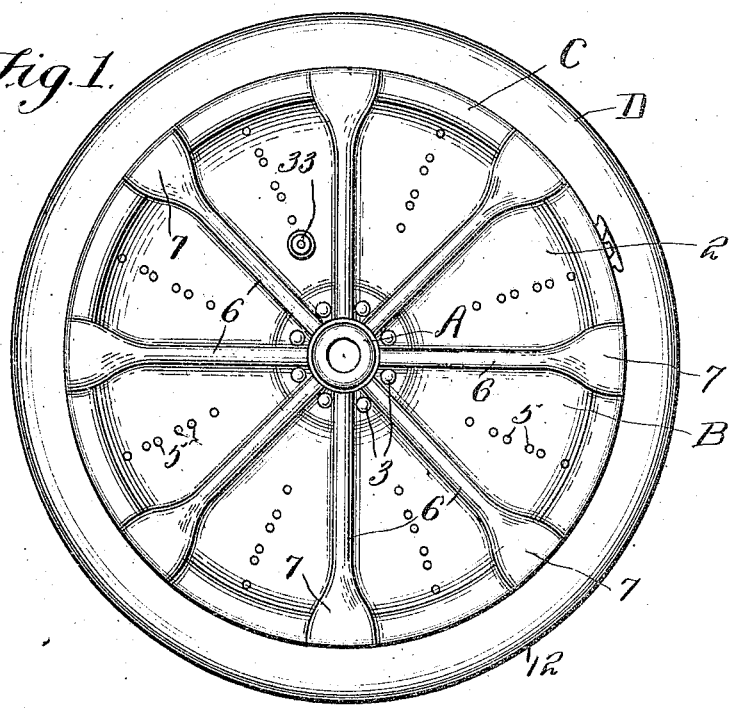
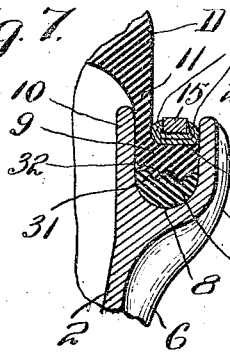
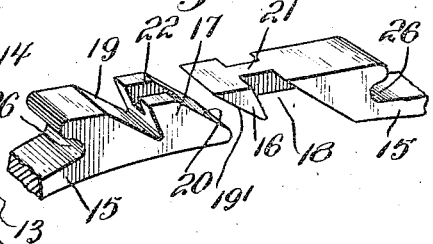
Witnesses
J. L. Wright
P. M. Smith
Inventor
James F. Evans
By Victor J. Evans
Attorney

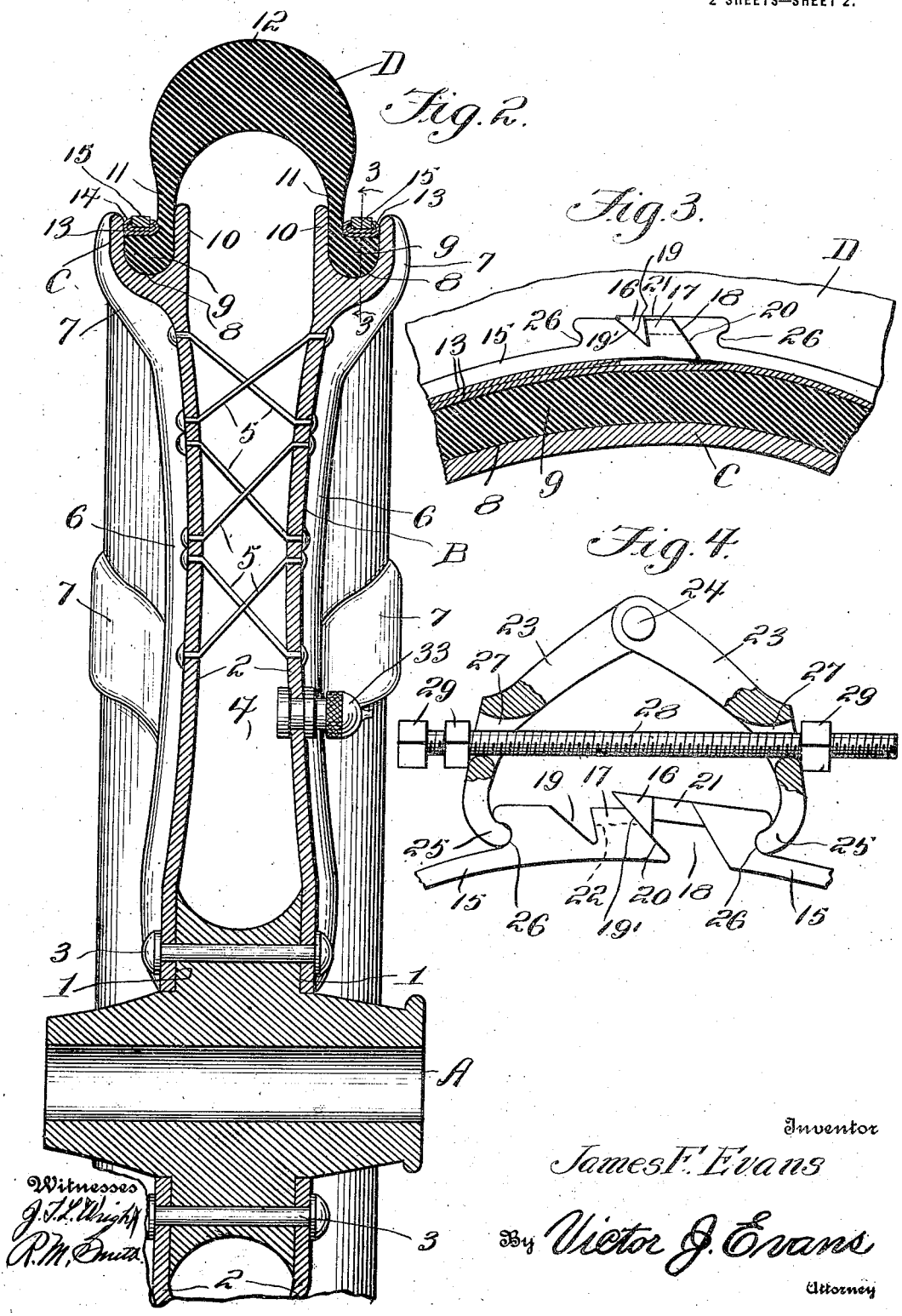

UNITED STATES PATENT OFFICE.

JAMES FRANCIS EVANS, OF MARTINSBURG, WEST VIRGINIA.

WHEEL.

1,154,497.  Specification of Letters Patent.  Patented Sept. 21, 1915.

Application filed October 2, 1914. Serial No. 864,653.

*To all whom it may concern:*

Be it known that I, JAMES F. EVANS, a citizen of the United States, residing at Martinsburg, in the county of Berkeley and State of West Virginia, have invented new and useful Improvements in Wheels, of which the following is a specification.

This invention relates to pneumatic wheels, the object in view being to produce a wheel which in itself forms the air chamber of a pneumatic tire, thereby dispensing with the necessity of using the ordinary fragile inner tube and at the same time providing for an air chamber of much greater capacity and one which will eliminate the objectionable rapid travel of air in an annular path and enable said air to move in a direction more nearly radial with respect to the center of the wheel, the result being that the tire is kept in a cooler condition and the life and durability thereof proportionately increased.

A further object of the invention is to produce a wheel in which the opposite sides thereof are formed of metal disks or plates so associated with the hub of the wheel as to provide an air tight chamber which is in communication with the inner face of the tire, the latter being supported solely by the body of air contained within the wheel and between the side plates or disks of the latter.

A further object of the invention is to provide a novel construction of tire body in its relation to the side plates or disks forming the body of the wheel; also practical and reliable means for effecting a tight joint at all points between the margins of the tire and the peripheral portions of the wheel.

With the above and other objects in view, the invention consists in the novel construction, combination and arrangement of parts, as herein described, illustrated and claimed.

In the accompanying drawings: Figure 1 is a side elevation of a wheel embodying the present invention. Fig. 2 is an enlarged diametrical section through the hub and one half of the wheel. Fig. 3 is an enlarged detail section on the line 3—3 of Fig. 2. Fig. 4 is a detail elevation partly in section showing the manner of and means for connecting and disconnecting the extremities of the clamping bands. Fig. 5 is a fragmentary view showing the overlapping end portions of one of the tire retaining hoops. Fig. 6 is a detail perspective view of the interlocking end portions of one of the clamping bands. Fig. 7 is a fragmentary cross section taken on the same line as Fig. 2, showing one of the flexible joint forming rings.

Referring to the drawings A generally designates the hub of the vehicle wheel of this invention, B the body of the wheel, C the tire holding rim and D the tire.

In carrying out the present invention, the hub A is constructed in such a manner as to provide shoulders 1 against which a pair of oppositely located side plates or disks 2, forming the body of the wheel, are fastened by means of bolts 3 or the equivalent thereof so as to form an air tight joint between said plates or disks and the hub.

The disks 2 forming the body of the wheel are arranged in spaced relation to each other so as to form an intervening air chamber 4 of materially greater cubical contents than the ordinary inner tube of the present day pneumatic tire. The plates 2 are connected at suitable points by means of ties 5 shown in the form of wires extending obliquely and crossing each other diagonally as shown in Fig. 2, said ties serving to relatively brace the side plates or disks 2 and prevent the same from spreading under the expanding action of the tire D. The plates 2. in the preferred embodiment of the invention, are further provided upon their outer sides with reinforcing ribs 6 forming in effect spokes for the wheel, the outer extremities of said ribs being preferably expanded as shown at 7 to provide increased strength along the peripheral portion of said side plates or disks.

The disks or plates 2 are formed in their peripheries with annular channels 8 designed to receive the marginal beads 9 with which the tire D is provided as best illustrated in Fig. 2, the said beads 9 being of such shape and size as to fit snugly within the channels 8 and outside of the inside walls 10 which define said channels.

The side walls 11 of the tire are relatively thin as compared with the tread 12 of the tire. The thick tread resists and practically prevents punctures and blow outs while the relatively thin side walls permit the tire to flex easily and expand laterally away from each other thus preventing any chafing or cutting action between the side walls of the tire and the inner walls 10 of the channeled peripheral portions of the side plates or disks.

In order to firmly fasten the beads 9 of the tire to the rim portion of the wheel, I employ in connection with each bead 9 and channel 8, a split or divided hoop 13 the end portions of which are overlapped as shown in Fig. 5. As shown, each of said hoops has its marginal edges recurved to form U-shaped flanges 14 beneath which the opposite extremity of the hoop is adapted to slide as shown in said figure. These recurved flanges 14 are not, however, essential, it only being requisite that the end portions of the hoops overlap as shown and described. Outside of and encircling each of said tire holding or retaining hoops is a clamping band 15 which is also split or divided as illustrated in Figs. 3, 4 and 6, the extremities of the band being provided with interlocking projections or lips 16 and 17 and notches 18 and 19. The projection 16 has a beveled face 19′ which is adapted to slide upwardly on the beveled extremity or face 20 of the other end of the band as clearly shown in Fig. 4, the part 16 being connected to one extremity of the band 15 by means of a relatively narrow neck 21 which is received in a groove or recess 22 in the projection 17.

In order to bring the extremities of each clamping band into interlocked engagement, any suitable tool may be provided such as that shown, for example, in Fig. 4 in which said tool is shown as comprising a pair of jaws 23 pivotally connected together at 24 and having hooked extremities 25 receivable in corresponding recesses or notches 26 in the end portions of the clamping bands. The arms 23 are provided with openings 27 to receive a bolt 28 in connection with which nuts 29 are employed which bear against the outer sides of the jaws 23 for the purpose of drawing the jaws toward each other and thereby effecting an interlocked engagement between the extremities of the bands. The tool may comprise two sets of jaws 23 so as to operate simultaneously on the two clamping bands at opposite sides of the tire thus enabling both bands to be adjusted in a single operation.

When the retaining or holding hoops 13 are in their proper place and the clamping bands 15 have been drawn tightly around said hoops, the beads 9 are tightly compressed in the channels of the rim portion of the wheel so as to form an air tight joint and prevent leakage of air between the tire and body of the wheel. In order to still further insure an air tight joint along the points of contact of the tire and wheel rim, additional joint forming rings 30 may be placed in the bottoms of the channels 8 as shown in Fig. 7, said rings 30 being formed of flexible material such as rubber and being cemented or otherwise fastened by an air tight joint against the bottoms or floors of said channels. The outer sides of the rings 30 will preferably be corrugated as shown at 31 and the meeting faces of the beads 9 may also be corrugated as indicated at 32 so as to match the corrugations 31. As the rings and the beads 9 are both flexible, the intermeshing corrugations will be tightly compressed together thereby forming a practical air tight joint.

33 designates an inflating valve for admitting air under pressure to the air chamber 4 of the wheel for the purpose of holding out or distending the tire sufficiently to enable the same to support the requisite load.

From the foregoing description taken in connection with the accompanying drawings it will now be seen that I do away entirely with an inflatable inner tube and the troubles incident to the use thereof. In lieu of said tube, the wheel itself forms the air chamber for the tire D and in view of the extent and capacity of the air chamber thus formed, the air is compressed in a substantially radial direction when the tire is subjected to its load and the ordinary road shocks, not only is a greater volume of air thus obtained but the air is prevented from being forced rapidly around the ordinary annular channel formed by the inner tube and therefore the air is kept comparatively cool, the tire being kept proportionately cool and thereby adding to its life and durability. While the air chamber is shown as extending from the peripheral portion of the wheel to a point close to the hub A, it will of course be apparent that the inner portion of said air chamber may be filled in solidly or the air chamber partitioned off so that only the outer portion thereof will form an effective air chamber.

Changes such as that just referred to may be made according to the use to which the wheel is to be put and other changes in the form, proportion and minor details of construction may be resorted to without departing from the principle or sacrificing any of the advantages of the invention.

What I claim is:—

1. In a vehicle wheel, a hollow wheel body having an annular air chamber and annular channels, in combination with a flexible tire having marginal annular beads fitting into said channels, tire holding hoops encircling said beads and lying in said channels, and clamping bands encircling said hoops, each of said bands being divided and provided with interlocking shoulders at its extremities.

2. A vehicle wheel having annular channels, flexible joint forming rings in air tight engagement with the bottoms of said channels in the outer periphery thereof, a flexible tire having marginal annular beads fitting into said channels, and tire holding hoops encircling said beads and lying in said channels.

3. A vehicle wheel provided with annular channels in the outer periphery thereof, in combination with a flexible tire having marginal annular beads fitting into said channels, tire holding hoops encircling said beads and lying in said channels, each of said hoops being divided and having its end portions in overlapping relation to each other, and clamping bands encircling said hoops.

In testimony whereof I affix my signature in presence of two witnesses.

JAMES FRANCIS EVANS.

Witnesses:
HERMAN A. EVANS,
SAMUEL W. STANLEY.

Copies of this patent may be obtained for five cents each, by addressing the "Commissioner of Patents, Washington, D. C."